United States Patent [19]

Ishihara

[11] Patent Number: 4,936,055

[45] Date of Patent: Jun. 26, 1990

[54] SPRING FILE

[76] Inventor: Nobuo Ishihara, 14-3, 2-Chome, Chiyozaki, Nishi-ku, Osaka-shi, Osaka-hu, Japan

[21] Appl. No.: 243,926

[22] Filed: Sep. 13, 1988

[51] Int. Cl.⁵ ............... B24D 15/04; B23F 21/23; B23D 71/06

[52] U.S. Cl. ................ 51/205 R; 51/392; 51/394; 29/78; 29/80; 76/24.1; 76/101.1

[58] Field of Search ............... 29/78, 79, 80; 51/205 R, 392, 394; 76/24 R, 101 R

[56] References Cited

U.S. PATENT DOCUMENTS

| | | | |
|---|---|---|---|
| 289,879 | 12/1883 | Almond | 51/392 |
| 563,651 | 7/1896 | Brooks | 15/104.19 |
| 2,687,561 | 8/1954 | Anderson | 29/78 |
| 3,861,087 | 1/1975 | Martin | 51/205 R |
| 3,956,858 | 5/1976 | Catlin et al. | 29/80 |

FOREIGN PATENT DOCUMENTS

| | | | |
|---|---|---|---|
| 0181576 | 10/1983 | Japan | 51/394 |
| 53215 | 10/1942 | Netherlands | 29/79 |
| 1273713 | 5/1972 | United Kingdom | 29/78 |

Primary Examiner—William E. Terrell
Attorney, Agent, or Firm—Jones, Tullar & Cooper

[57] ABSTRACT

A spring file comprises a coiled spring, the outer flattened periphery of which is coated with abrasive particles so as to form a file face and the method of manufacturing the same. In a first arrangement of the spring file, the coiled spring has the file face coated with the abrasive particles and is joined to the tip of a hand grip. In a second arrangement, the coiled spring has the file face coated with the abrasive particles and is of considerable length and thus used portions thereof can be removed by cutting off.

4 Claims, 3 Drawing Sheets

SPRING FILE

BACKGROUND OF THE INVENTION

1. Field of the Invention

The present invention relates to a novel handy spring file.

2. Prior Art

A generally known lever file is small-sized and convenient for use and doses not require large equipment. But since the file face of the lever file is formed of a rigid material, when filing or refiling the parts and tools having intricately shaped surfaces to be filed, particularly e.g. a cutting face (blade face) of a spiral cutting tool such as a spiral end mill, a spiral tap or the like, a dead space is formed between the portion to be filed and the file face, and the file is unable to bring the file face into uniform contact with the work piece and cannot provide good filing.

On the other hand, when filing or refiling the portion having a complicated shape, a problem of requiring skill also arises. Because of this problem, when machine parts and tools having complicated structural portions to be filed are filed, it is general practice to use a special tool and grinding machine adapted for the portions to be filed, but the use of the tool and machine of this type requires large-scale equipment and increases cost.

SUMMARY OF THE INVENTION

The present invention is proposed to solve the above mentioned problem.

Accordingly, it is a primary object of the invention to provide an easy-to-operate handy file capable of uniformly filing a work piece whose portions to be filed are complicated in shape.

Another object of the invention to provide a method of manufacturing the easy-to-operate handy file.

The spring file of the invention is embodied in various forms. One form is of the construction in which a coiled spring body having the file face formed thereon is directly added to the tip of a hand grip, the file face being formed by fixing abrasive particles to the flattened outer peripheral surface of the coiled spring. Another form is of the construction in which a file face is formed by fixing abrasive particles to the flattened outer peripheral surface of a long coiled spring and the used portions of the coiled spring are successively broken off.

DETAILED DESCRIPTION OF THE INVENTION

Preferred embodiments of the present invention will be described hereinafter in conjunction with the accompanying drawings.

A spring file according to the present invention has a file face formed in a such a way that abrasive particles are attached to the flattened outer peripheral surface of a coiled spring having appropriate resiliency and accordingly, various modifications of the spring file are feasible.

And according to the method of the invention, after the waved convex surface $1a$ of a coiled spring 1 is flattened at $1a'$, a file face is formed by attaching abrasive particles 3, such as diamonds to the surface $1a$.

The spring file thus formed has the file face $1b$ having the abrasive particles attached thereto.

Figure 1:
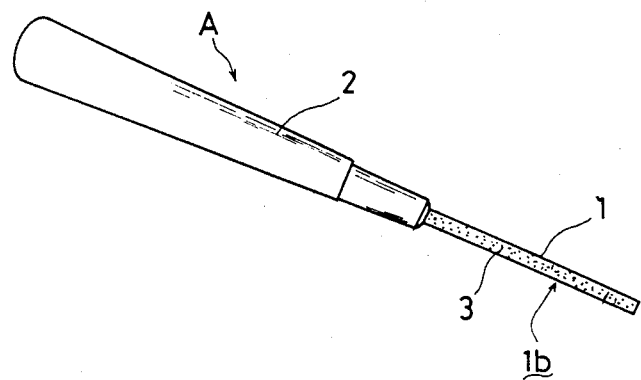
FIG. 1 is a view of a primary embodiment of the present invention.
Figure 2:
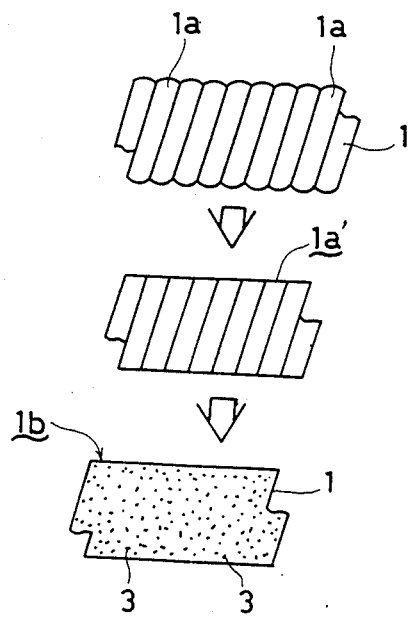
FIG. 2 is an explanatory view showing steps of the process for making a file face according to the present method.

As shown in FIG. 1, a tip of a hand grip 2 is a body 1 of coiled spring having appropriate resiliency. The body 1 has a file face $1b$ formed in such a way that abrasive particles 3, e.g. of diamond, are fixedly attached to the entire flattened outer peripheral surface of the coiled spring body. The file face $1b$ in this embodiment can simply be formed in such a method that each convex portion $1a$ of the surface of the body 1 is flattened so as to form a planer surface $1a'$ to which the diamond particles 3 are electrically attached in the following process, as shown in FIG. 2. The particles employed in the present invention may be of artificial diamonds.

Particularly in this embodiment, the entire flattened outer peripheral surface of the body 1 constitutes the file face $1b$ thus to facilitate filing operations.

Figure 3:
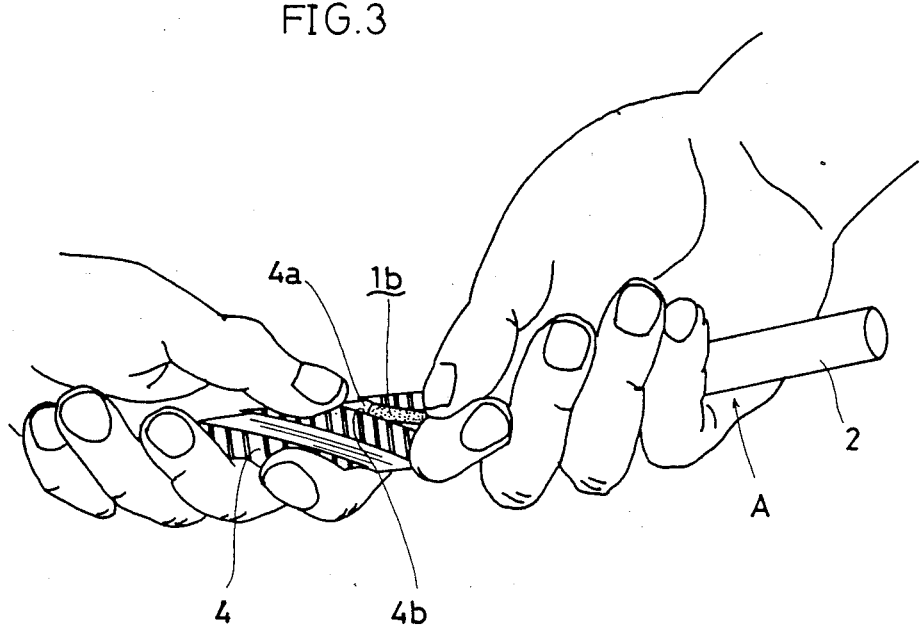
FIG. 3 is an explanatory view showing the use of a spring file according to the present invention.

FIG. 3 shows the use of a spring file A according to the present invention, in which an end mill 4 is being filed with the spring file A which works with its file face $1b$ moving on and along the blade face $4b$ formed in a spiral groove $4a$ of the end mill 4.

It will be understood that appropriate abrasive particles such as borazon, carborundum, or the like can selectively be employed in relation to the use of a spring file and adapted to complete the file face $1b$ when coated therewith, e.g. by means of adhesive and thus, the spring file is positively utilized for filing of metal, wood, or other materials.

Figure 4:
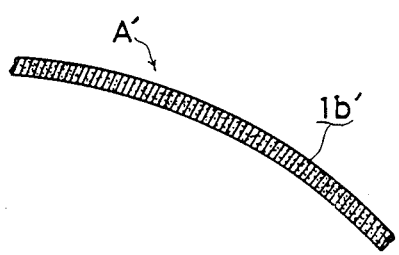
FIG. 4 is a view of another embodiment of the present invention.

FIG. 4 shows another embodiment of the present invention. In this embodiment a file A', as distinguished form the file shown in FIG. 1, comprises a coiled spring of considerable length, the flattened outer periphery of which is coated with abrasive particles. The advantage is that every used portion of a file face $1b'$ of the spring file A' can be removed by cutting after it is finished being used.

According to the spring file of the present invention, its coiled spring representing a file face is available in a variety of shapes in cross section; round as illustrated, triangular, square, oval, etc.

It is apparent from the above description that the spring file of the present invention includes its file face formed on a coiled spring which has appropriate resiliency so that it is flexible and thereby corresponds to the configuration of a surface to be filed. This allows the file face to come into even contact with the surface to be filed and thus, an unskilled worker can consistently carry out filing operations.

Additionally, because of this advantageous arrangement, the spring file has great utility and can be used for any filing purpose with no need of a special made instrument which is so arranged to correspond to the particular shape of a surface to be filed.

What is claimed is:

1. A method of manufacturing a spring file from an elongated coiled spring body including a plurality of engaged coil loops defining a waved convex outer peripheral surface along its length, comprising the steps of:

longitudinally flattening the waved convex outer peripheral surface of the coiled spring body; and attaching abrasive particles to the flattened surface so as to form a continuous file face.

2. A spring file having a coiled elongated spring body including a plurality of engaged coil loops defining an outer surface which is longitudinally flattened and coated with abrasive particles to form a continuous file surface, said coiled spring body being elastically deformable in any direction along its length such that the file surface is adaptable to conform to the surface being ground.

3. The spring file as defined in claim 2, further having a hand grip to which said spring body is attached.

4. The spring file as defined in claim 2, wherein said spring body comprises a plurality of portions which can be separately cut from said spring body.

* * * * *